United States Patent [19]

Curtiss et al.

[11] 4,104,346
[45] Aug. 1, 1978

[54] PROCESS FOR MOLDING A SUBSTANTIALLY ISOTROPIC ISOCYANATE-BASED POLYMER FOAM BUN

[75] Inventors: John N. Curtiss, Seabrook; Charles E. Koehler, Baytown; Pat L. Murray, Dayton, all of Tex.

[73] Assignee: The Upjohn Company, Kalamazoo, Mich.

[21] Appl. No.: 709,777

[22] Filed: Jul. 29, 1976

[51] Int. Cl.² .............................................. B29D 27/04
[52] U.S. Cl. ...................... 264/51; 249/82;
249/163; 264/55; 264/333; 264/DIG. 84;
425/817 R
[58] Field of Search ............. 264/54, 51, 55, DIG. 84,
264/333; 249/82, 163; 425/DIG. 11, DIG. 12,
DIG. 14, DIG. 29, DIG. 30, DIG. 32, 817 R;
267/69; 292/322, 353; 16/71; 248/330, 334

[56] References Cited

U.S. PATENT DOCUMENTS

| | | | |
|---|---|---|---|
| 1,002,448 | 9/1911 | Putnam | 267/69 |
| 2,512,809 | 6/1950 | Perry et al. | 249/82 |
| 2,687,555 | 8/1954 | Anspon et al. | 249/82 X |
| 2,805,058 | 9/1957 | Grant | 267/69 |
| 2,817,878 | 12/1957 | Anspon | 425/DIG. 12 |
| 3,111,365 | 11/1963 | Hood et al. | 264/54 |
| 3,124,627 | 3/1964 | Hood | 264/54 |
| 3,154,606 | 10/1964 | Morecroft et al. | 264/54 |
| 3,249,486 | 5/1966 | Voisinet et al. | 264/54 X |
| 3,275,282 | 9/1966 | Schulz | 249/82 |
| 3,692,361 | 9/1972 | Ivarsson | 267/69 X |
| 4,014,967 | 3/1977 | Hattenberger et al. | 264/55 X |

FOREIGN PATENT DOCUMENTS

| | | | |
|---|---|---|---|
| 2,258,948 | 8/1976 | France | 264/55 |
| 50-135172 | 10/1975 | Japan | 264/DIG. 84 |
| 962,526 | 7/1964 | United Kingdom | 249/82 |

Primary Examiner—Philip Anderson
Attorney, Agent, or Firm—Denis A. Firth; John Kekich

[57] ABSTRACT

A mold is described for the molding of substantially isotropic isocyanate-based polymer foam buns. The mold is a box mold which has sidewalls of which at least one pair disposed in parallel relationship is adapted to move outwardly when subjected to pressure exerted by the expanding foam during the molding operation. The outward movement of the sidewalls is controlled by stops provided on the periphery of the mold floor, said sidewalls being free to slide over the surface of the floor. The lid of the mold is supported in sliding engagement with the upper edges of the sidewalls. The mold and the process of fabricating foam buns therewith is particularly suitable for use in situations (e.g. operation in the field) in which it is not possible or practicable to employ continuous bunstock machines. The mold is relatively inexpensive and readily dismantled for transportation to a fabrication site.

10 Claims, 5 Drawing Figures

PROCESS FOR MOLDING A SUBSTANTIALLY ISOTROPIC ISOCYANATE-BASED POLYMER FOAM BUN

BACKGROUND OF THE INVENTION

1. Field of the Invention

This invention is directed to a process for molding polymer foam and is more particularly directed to a process for fabricating polymer foam buns from isocyanate-based polymer foam forming mixtures.

2. Description of the Prior Art

Processes for the preparation of substantially isotropic polymer foams derived from isocyanates in the form of continuous bunstock are well-known in the art; see, for example, U.S. Pat. Nos. 3,249,486; 3,655,311 and 3,734,668. Said processes require the use of complex machinery and ancillary storage facilities for polymer foam chemicals, all of which are not readily transportable. Accordingly, it is customary to manufacture foam bunstock at a central production facility and to transport the finished bun to the site of use by any appropriate means. Due to the high cost of transporting such buns by commercial freight, the area which can be served from a central manufacturing plant is relatively limited. Since the polymer chemicals employed in the manufacture of the bun occupy approximately 30 times less space than the finished foam, it is theoretically more economical to transport the chemicals to the site at which the foam is to be used and to manufacture the foam on the site. The sheer bulk of the continuous bunstock manufacturing plant clearly makes it impossible to transport the latter to the site at which the foam is to be used. An even greater problem exists where the foam is to be fabricated in relatively undeveloped countries where, even if the requisite machinery for manufacture of continuous bunstock is available, the means of transporting foam from the manufacturing site to the site of its use may either be unavailable or unsatisfactory.

It has therefore long been desirable to develop a satisfactory method of molding polymer foam buns which employs relatively simple and readily transportable molding means which can be brought to, and used at, the site at which the foam is to be used. It is an object of this invention to provide a molding apparatus and process which meets these requirements. It is also an object of this invention to provide molding apparatus and procedures for the preparation of relatively low density (of the order of 2 to 4 pcf.), substantially isotropic, isocyanate-based rigid polymer foams. By isotropic foam is meant a rigid foam which has uniform cell structure and which exhibits substantially equal strength characteristics along the X, Y and Z direction axes to which a compressive force is applied.

The use of a box mold having fixed sides and top is not suitable for the preparation of isotropic rigid isocyanate-based polymer foams. The use of molds having "floating" lids as been described; see, for example, Belgian Pat. No. 824,625 and U.S. Pat. No. 3,291,873. The use of such molds gives foams which have improved cell structure in the upper layer but still does not produce useful isotropic foam.

In the preparation of continuous bunstock described in the aforesaid U.S. Pat. No. 3,249,486, the mold is provided with a fixed upper mold piece and sidewalls which are pivoted at their upper edges and are free to be pushed outwardly about the pivoted edge against the action of retaining springs. Such a procedure does not give rise to truly isotropic foam and, even if it did, is not readily adaptable to use in a box mold for batch type production.

SUMMARY OF THE INVENTION

This invention comprises a process for molding isocyanate-based polymer foam bunstock in a batch apparatus. The apparatus comprises a mold in which at least one pair of the sidewalls in parallel relationship is free, within preselected limits, to move outwardly in response to pressure exerted by the rising foam and in which the lid of the mold is also free to rise in response to such pressure. The apparatus is capable of being dismantled readily for transportation and of being assembled readily at the site at which foam is to be produced.

The term "isocyanate-based polymer foam" is inclusive of a variety of foams which can be derived by interaction of polyisocyanates with other reactants under foam producing conditions in accordance with techniques well-known in the art. The term is inclusive of polyurethane foams which are produced by reaction of polyisocyanates with polyols under foam producing conditions, polyisocyanurate foams which are produced by reaction of polyisocyanates with trimerizing catalysts under foam producing conditions and optionally in the presence of a minor amount of polyol, and polyisocyanurate-polycarbodiimide foams which are produced by reacting a polyisocyanate, under foam producing conditions, in the presence of a trimerizing catalyst and a catalyst for the conversion of isocyanates to carbodiimides.

DETAILED DESCRIPTION OF THE INVENTION

Figure 1:
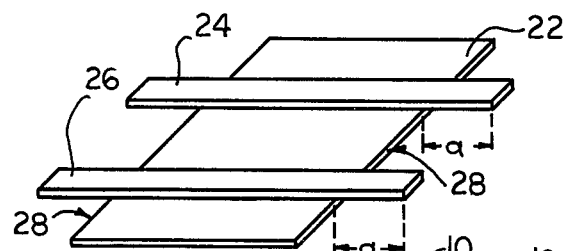
FIG. 1 is a partially exploded perspective view of a mold assembly in accordance with the invention.

The apparatus of the invention comprises a box mold fabricated from elements, namely a floor, a lid and sidewalls which, when assembled as a unit, are not, except in the case of the various sidewall members, secured to each other by fastening means such as brackets, clamps, hinges and the like. Thus, at least one parallel pair of the sidewalls merely rest with their bottom edges in contact with the floor of the mold and are free to move laterally across the floor of the mold. Similarly, the lid of the mold merely rests upon the upper edges of the sidewalls and is not secured thereto by any fastening or hinging means. The vertical edges of the sidewalls, which abut when the mold is assembled, are attached to each other by extensible coupling means which can take various forms such as coil springs, elastic cords and the like. The coupling means are such that, under the influence of the pressure exerted by the foam rising in the mold, the sidewalls which are free to move do so outwardly from their initial positions so that the edges of the sidewalls are no longer abutting.

Illustratively, the floor of the mold in accordance with the invention comprises a planar sheet of material such as metal (e.g. steel, aluminum and the like), wood or plastic. The sidewall members of the mold, which may be fabricated from any of the above types of material, are disposed with their lower edges resting upon, but not necessarily attached to, the upper surface of the floor of the mold. In a particular embodiment the sidewall members are four pieces which, when assembled, define a square or rectangular mold cavity. However, it will be apparent that three, four, five, six or more sidewall members can be employed depending upon the desired configuration of the mold cavity. Each of the abutting edges of the sidewall members are coupled to the adjoining abutting edge of the adjacent member by means of one, or a plurality, of extensible coupling members. The latter can take the form of coil spring devices, elastic rope, elastic tubing, and the like.

When the sidewall members are assembled in the above manner with their vertical edges abutting and coupled together, they define an area on the floor of the mold which is less than the whole of the area of said floor. That is to say, the floor of the mold extends outwardly beyond the outside of the cavity defined by the sidewall members at least in those directions in which the sidewall members are free to move. Disposed on the portion of the floor of the mold which extends outwardly of the mold cavity are a series of stop means. Advantageously, when all the sidewall members are free to move outwardly, the stop means are disposed in a substantially symmetrical manner around the outer edges of the floor of the mold and correspond in their overall configuration to an enlarged version of the configuration of the assembled sidewall members. If desired, said stop means can comprise a single strip or like means extending around the appropriate parts of the periphery of the floor.

In the case where less than all the sidewall members are free to move outwardly, said stop means are provided only in respect of the sidewall members which are movable. Generally speaking the stop means are provided in locations such that a pair of sidewalls which are free to move and which are initially in substantially parallel relationship will terminate in parallel relationship after their movement is arrested by the stop means.

The mold is completed by means of a lid which is placed upon, and supported by, the upper edges of the sidewall members but which is not attached thereto. The lid member is so arranged that its outer edges, or a plurality of projections such as strips and the like attached to its outer edges, project beyond the outer edges of the cavity defined by the sidewall members. The reasons for this will become apparent as this description proceeds.

Advantageously, the floor, sidewalls, and lid of the mold are lined with a material such as paper, waxed paper, plastic film, etc., which is folded along the edges of the sidewalls in order to contain the initially fluid polymer foam ingredients which are to be charged into the mold cavity. The liners also serve to facilitate demolding of the completed foam.

In preparing a molded polymer foam in accordance with the invention the mixture of polymer foam forming ingredients is charged to the mold, using any of the mixing and charging devices commonly employed in the art, with the sidewall members of the mold disposed in abutting relationship.

The mold lid is placed in position and the foaming of the mixture is allowed to proceed. As the foam begins to rise, the pressure exerted on the inner side of the sidewall members will increase. When the pressure exerted on the sidewall members is sufficient to overcome the restraining force exerted by the coupling means holding the sidewall members in abutting relationship, those sidewall members which are free to move will be forced outwardly with the upper and lower edges of said members sliding over the underside of the projecting edges of the lid and the top of the projecting edges of the mold floor, respectively. This sideways movement of the sidewall members will continue until expansion of the foam is complete or until the sidewall members make contact with the stop means located on the periphery of the mold floor member. Advantageously, the stop means are so positioned that the sidewall members will make contact therewith, and their movement be halted thereby, at a time immediately before the completion of expansion of the foam.

The foam rising in the mold cavity will also exert pressure against the underside of the mold lid and the latter will be lifted from contact with the upper edges of the sidewall members and will float freely on the surface of the rising foam. As will be apparent to one skilled in the art, the weight of the foam lid is so chosen that it will tend to cause the rising foam to expand laterally against the sidewall members thereby producing a final bun which will be substantially rectangular in cross-section. However, the weight of said lid is not so great that it will result in any substantial crushing or distortion of the cells in the top surface of the rising foam. The most appropriate weight of mold lid necessary to comply with the above requirements can readily be determined by a process of trial and error.

As will also be apparent to one skilled in the art, the amount of foam mix charged to the foam cavity in the above operation should be such as to exceed the amount necessary to fill the said cavity (without expansion of the sidewalls) under free rise conditions. Advantageously, the amount of foam mix charged to the cavity is from 1.25 to 1.5 times the amount which would be just necessary to fill said cavity under free rise conditions.

The process and apparatus of the invention will now be illustrated further by reference to the drawings.

Figure 2:
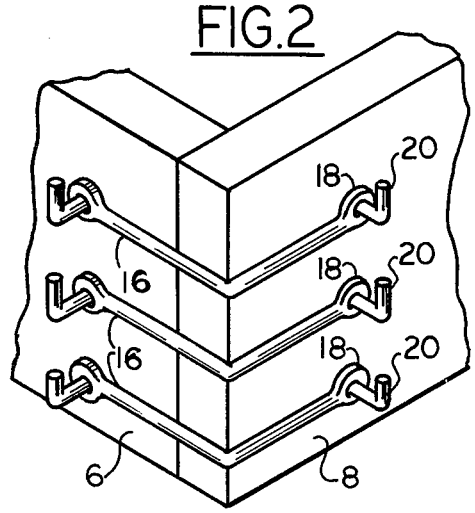
FIG. 2 is a partial view of a particular feature of the mold assembly shown in FIG. 1.

In the embodiment of a mold assembly of the invention shown in partially exploded view in FIG. 1, the floor 2 of the mold is a rectangular sheet, advantageously fabricated from plywood, aluminum and the like, provided with raised edges 4 on the periphery thereof. The four sidewall members 6, 8, 10, 12 are disposed with their lower edges in sliding engagement with the floor 2 of the mold and define a mold cavity 14 of rectangular cross-section. The sidewall members are held with their vertical edges in abutting relationship by means of extensible rubber coupling members 16 which have loops 18 at each end thereof which engage hooks 20 disposed on the outer surfaces of the ends of the various sidewall members 6, 8, 10, 12. The partial view shown in FIG. 2 illustrates in more detail the arrangement of coupling members 16 with loops 18 engaging hooks 20 at the junction of the vertical edges of sidewall members 6 and 8.

The sidewall members 6, 8, 10, 12, when assembled to form the mold cavity 14 as shown in FIG. 1, are preferably disposed symmetrically on the mold floor 2, i.e. the distance between the outer surface of each sidewall member and the corresponding raised edge 4 on the periphery of the mold floor 2 is substantially the same. The distance in question is preselected to allow the optimum degree of expandability of the sidewall members for the particular polymer foam which is to be molded. This distance can be adjusted by various means. For example, the linear dimensions of the various sidewall members can be varied and or the position of the raised edges 4 can be made adjustable by providing a series of positions on the periphery of the mold floor 2 in which the various raised edges 4 can be temporarily secured by means such as bolts, screws and the like.

The mold lid 22 is a sheet-like member having an overall planar configuration which corresponds substantially to that of the top of the mold cavity 14. The mold lid 22 is provided with strut members 24 and 26 which are secured by appropriate means, such as bolts, screws, welds and the like to the upper surface of said mold lid. The strut members 24 and 26 project beyond the outer edges 28 and distance $a$ which is advantageously at least equal to the distance between the outer surface of any of the sidewall members 6, 8, 10, 12 and the corresponding raised edge 4 opposite the sidewall member in question.

The mold lid 22, when placed on the mold cavity 14 with the projecting ends of the struts 24 and 26 resting in sliding engagement with the upper edges of sidewall members 8 and 12, serves to form a substantially closed mold.

In carrying out a molding procedure in accordance with the process of the invention, the various sidewall members are assembled as shown in FIG. 1 to form mold cavity 14. The surfaces of the sidewall members 6, 8, 10, 12, the mold floor 2 and the mold lid 22 which are to come into contact with the foam are lined with sheets of release paper (not shown) and the like to facilitate demolding at the end of the mold operation and also to contain the liquid polymer mix as it is charged inside the mold cavity.

Polymer foam mix is charged to the mold cavity 14 by any of the mixture and dispensing means commonly used in the art (including manual mixing and dispensing in situations in which it is not possible to employ mechanical means).

The amount of polymer foam mix charged to the mold is generally such that there is an excess over the amount which would be just sufficient to fill the mold, in unexpanded condition of the latter, under free rise conditions.

After the polymer foam mix has been charged to the mold cavity 14 the mold lid 22 is lowered into place so as to substantially close the mold. The projecting ends of the struts 24 and 26 rest in sliding engagement with the upper edges of sidewalls 8 and 12 and serve to support the lid 22 in mold closing position. As the foam mix in the mold cavity 14 begins to rise, it exerts an increasing lateral pressure on the inner surfaces of the sidewall members 6, 8, 10, 12. When the lateral pressure exerted on the said sidewall members exceeds the restraining forces exerted by the elastic coupling members 16, the sidewall members will be caused to move outwardly and away from each other until the movement of each of said members is eventually arrested by the raised side portions 4. The time, i.e. the particular stage in the foam rise, at which the outward movement of the sidewalls begins and the rate at which the movement of the sidewalls takes place can be controlled as desired by appropriate preselection of the tension to be exerted by the coupling members 16. The distance through which the individual sidewall members 6, 8, 10, 12 are free to move is also preselected in the manner already described.

When the rising foam in the mold cavity 14 reaches the underside of the mold lid 22 the latter will, depending upon its weight, exert a restraining force on the further expansion of foam in the vertical direction, thus tending to cause further expansion of the foam in a lateral direction. The vertical restraint on upward expansion of the foam will obviously continue unless and until the upward pressure exerted by the foam exceeds the downward pressure exerted by the lid. By appropriate adjustment of the weight of said lid the yield point, i.e. the point beyond which the foam exerts sufficient upward pressure to cause said lid 22 to rise, can be preselected as desired. Further, by appropriate coordination of the selection of the weight of lid 22 and the restraining pressure exerted by flexible coupling members 16 it is possible to achieve any desired combination of lateral and vertical temporary restraints on the movement of the rising foam. The most appropriate combination of these parameters necessary to achieve substantial isotropicity in the resulting foam can be readily determined by a process of trial and error.

Figure 3:
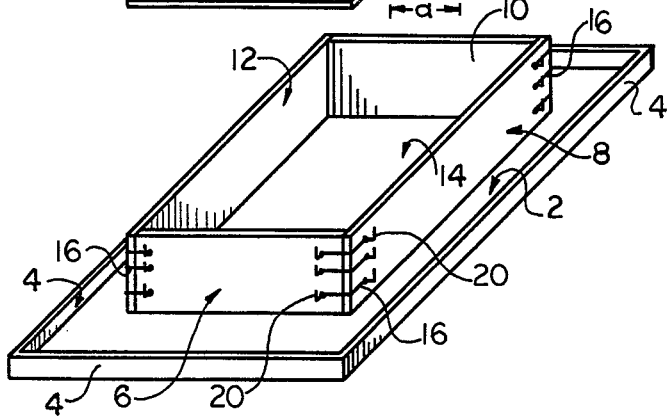
FIG. 3 is a perspective view of a completed polymer foam molded in the assembly shown in FIG. 1.

FIG. 3 shows the final appearance of a typical expanded foam and expanded mold elements at the completion of the above process when the latter has been carried out by charging foam mix to the initially assembled mold shown in FIG. 1.

Figure 4:
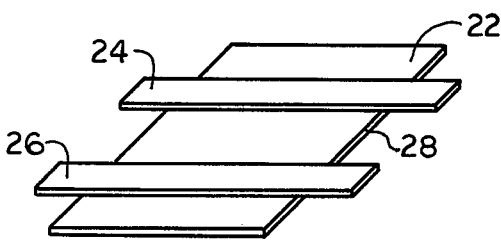
FIG. 4 is a partial view of an alternative embodiment of a mold assembly in accordance with the invention.

It will be appreciated that the above description and drawings serve to illustrate only one typical embodiment of the process and apparatus of the invention but various modifications thereof can be made without departing from the scope of the invention. For example, the sidewall members 6, 8, 10, 12 can be fabricated and assembled so as to give a mold cavity with outwardly flaring walls as illustrated in the partial perspective view shown in FIG. 4. In further modifications of the mold apparatus of the invention the stop means used to limit the sideways movement of the sidewall members need not take the form of continuous raised edges 4 but can be in the form of a plurality of individual raised projections such as pins, blocks and the like.

Figure 5:
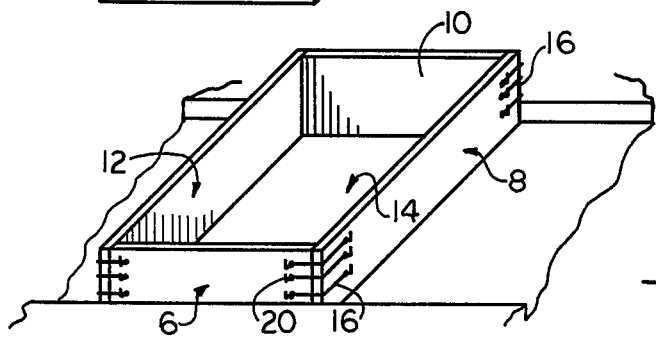
FIG. 5 is a partially exploded perspective view of another embodiment of a mold assembly in accordance with the invention.

FIG. 5 illustrates a modification of the mold assembly shown in FIG. 1 in which only two of the sidewall members are free to move laterally. In the mold assembly of FIG. 5 the sidewall members 8 and 12 are free to move laterally in response to the pressure of expanding foam whereas sidewall members 6 and 10 are in abutting relationship with the raised edges 4 of the mold floor.

Other modifications which can be made to the above described mold apparatus without departing from the scope of the invention will be readily apparent to one skilled in the art.

As will be seen from the above description of the mold apparatus of the invention, the said apparatus is relatively simple in design and the various elements thereof can be readily assembled and disassembled, without the use of elaborate tools, for transportation to any desired site of use. Accordingly, the apparatus and process of the invention is particularly suited to use in relatively remote areas in which it is impossible, or not economically feasible, to install and operate more conventional molding apparatus such as continuous bunstock manufacturing machinery. The advantages which flow from these considerations have been discussed hereinabove.

We claim:

1. In a process for molding a substantially isotropic isocyanate-based polymer foam bun by charging an isocyanate-based polymer foam forming mixture to a box mold, the improvement which comprises charging said foam forming mixture to a mold having
   (i) a floor,
   (ii) sidewalls of which at least one oppositely disposed pair is adapted to slide laterally outwards on said floor, said sidewalls being held in initially abutting relationship by extensible coupling means, and
   (iii) stop means provided on said floor of said mold to limit the outward movement of such of said sidewalls as are adapted to slide laterally;

the amount of foam forming mixture so charged being in excess of the amount which, after expansion under free rise conditions, is necessary to fill said mold cavity in unexpanded condition of the latter;

closing said mold by means of a cover slidably mounted on, but not attached to, the upper edges of said sidewalls;

permitting said laterally slidable sidewalls to be pushed outwardly towards said stop means when the lateral pressure exerted by the rising foam exceeds the restraining pressure exerted by said extensible coupling means; and permitting said mold cover to float freely on the upper surface of said rising foam after the latter contacts the underside of said cover.

2. A process according to claim 1 wherein said sidewalls are disposed in a substantially vertical plane.

3. A process according to claim 1 wherein said sidewalls are disposed in a plane inclined to the vertical, the cross-sectional area defined by the tops of said sidewalls being greater than that defined by the lower ends of said sidewalls.

4. A process according to claim 1 wherein said sidewalls define a rectangle, the vertical edges of said sidewalls being held in initially abutting relationship by extensible coupling means which yield under the pressure exerted by the foam generated in said mold.

5. The process of claim 4 wherein said extensible coupling means comprise coil springs.

6. The process of claim 4 wherein said extensible coupling means comprise elastic cords.

7. The process of claim 4 wherein all four sidewall members are adapted to slide laterally and outwardly.

8. The process of claim 4 wherein two oppositely disposed sidewall members are adapted to slide laterally and outwardly and the other two sidewall members are rigidly fixed in position.

9. The process of claim 1 wherein the amount of foam forming mix charged to said mold is from about 1.25 to about 1.5 times the amount required to completely fill said cavity after expansion of said foam mix under free rise conditions.

10. A process according to claim 1 wherein the restraining pressure exerted by said extensible couplings and the weight of said cover are preselected and coordinated so as to provide that the appropriate combination of lateral and vertical pressures is exerted on said rising foam.

* * * * *